March 17, 1925.   1,530,095

L. C. SHARP

FORAGE MILL

Filed July 21, 1922   6 Sheets-Sheet 1

Fig. 1.

Witness:
R. J. Honomichl.

Inventor:
L. C. Sharp.
By David O. Barrell,
Attorney

March 17, 1925.

L. C. SHARP 1,530,095

FORAGE MILL

Filed July 21, 1922

Witness:
R. J. Honomichl.

Inventor:
L. C. Sharp.
By David O. Barnell.
Attorney

March 17, 1925.

L. C. SHARP

FORAGE MILL

Filed July 21, 1922

Witness:
R. J. Honomichl.

Inventor:
L. C. Sharp.
By David O. Barnell.
Attorney

March 17, 1925.

L. C. SHARP 1,530,095

FORAGE MILL

Filed July 21, 1922   6 Sheets-Sheet 5

Witness:
R. J. Honomichl.

Inventor:
L. C. Sharp.
By David O. Barnell,
Attorney

Patented Mar. 17, 1925.

1,530,095

UNITED STATES PATENT OFFICE.

LEE C. SHARP, OF PLATTSMOUTH, NEBRASKA, PETERS TRUST COMPANY, EXECUTOR OF THE ESTATE OF THE SAID LEE C. SHARP, DECEASED.

FORAGE MILL.

Application filed July 21, 1922. Serial No. 576,475.

*To all whom it may concern:*

Be it known that I, LEE C. SHARP, a citizen of the United States, and a resident of Plattsmouth, in the county of Cass and State of Nebraska, have invented certain new and useful Improvements in Forage Mills, of which the following is a specification.

My invention relates to forage mills, or machines for grinding and reducing forage materials such as hay, corn-stalks and the like, to a comminuted or meal-like consistency. It is the general object of my invention to provide in a single mechanism the requisite means for rapidly and effectively reducing materials of the class mentioned to uniform comminuted product containing a minimum amount of dust and very fine particles, and having no pieces larger than a determined maximum. More particular objects of my invention are to provide means for tearing up or shredding the larger masses of the material fed to the machine, and for carrying the shredded material at a controlled rate to the cutting devices; to provide cutting mechanism adapted to reduce the stems and coarser portions of the material to short lengths; to provide in said cutting mechanism knife-plates or cutters of such form that each has a plurality of edges which may be successively presented for use, and of such inexpensive structure that after all of their sharp edges have become dulled the plates may be discarded and replaced by new ones rather than re-sharpened; to provide a combined screen and grinding mechanism to which the material is delivered from the cutting mechanism and to which is also delivered the portions of the material which have been sufficiently reduced by the shredding devices; to provide in said last-named mechanism space in which an excess volume of the cut material may accumulate temporarily should the rate of delivery thereto of the cut material momentarily exceed the rate at which the material is being finished; to provide speed-varying driving means by which the speed-ratio of the shredding devices to the cutting devices may be varied as desired during the operation of the machine; to provide a cutting-cylinder consisting of a plurality of light-weight units each having a safety-drive device, whereby to prevent breakage of the unit by engagement with large foreign bodies of refractory material, such as are sometimes accidentally present in the forage materials operated upon; to provide in the main driving connection a safety device adapted to automatically disconnect the operating mechanism from the source of power under a determined excess load; to provide means for either moistening or slightly drying the milled material simultaneously with the delivery thereof from the cutting and grinding mechanism; and to provide certain other desirable structures and combinations of parts, as fully set forth hereinafter.

In the accompanying drawings.

In the illustrated embodiment of my invention I provide a main base 12, having at one end an upwardly projecting portion, or pedestal 13 to which is secured the bearing-standard 14. In said standard is journaled the main driving-shaft 15 which carries intermediate the bearings the main drive-pulley 16 adapted for connection by belt with a suitable source of power. The pedestal 13 is so proportioned that when desired the bearing-standard may be replaced by an electric motor, of which the armature-shaft will have the same position as the driving-shaft 15, so as to be connected with the driven parts in the same manner as said shaft 15. At the end of the base 12 adjacent to the pedestal 13 is secured the exhaust-blower casing 17, the intake opening of said casing being in communication with a conduit 18 extending longitudinally of the base from said end, as indicated by dotted lines in Fig. 1. The opposite end of said conduit is turned laterally toward the front side of the machine and communicates with a hopper 19 formed integrally with the base at the front thereof. At the outer side of the blower-casing 17 is a supporting-bracket 20 for the impeller-shaft thereof, on which is carried the pulley 21, the latter being connected by a belt 22 with a larger pulley 23 on the outer end of the main drive-shaft 15. The main frame of the machine is mounted on a pedestal formed integrally with and extended up from the base 12 at the end thereof adjoining the hopper 19, a portion of said frame being extended out over the hopper and being connected therewith. In the end-portions 24 of said main frame are formed bearings for the various longitudinal shafts hereinafter referred to, and said end-portions 24 are connected by various longitudinal frame and casing members which form the enclosure or housing for the forage-reducing rollers and cylinders.

Figures 7, 9, 11:
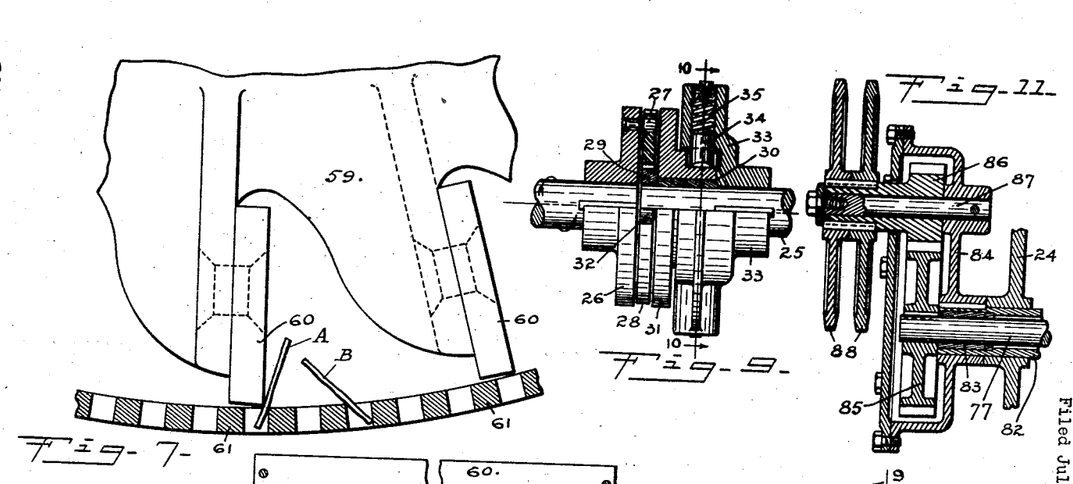
Fig. 7 is a detail section through a portion of the grinding-cylinder or screen-beater and screen.
Fig. 9 is a detail side view and partial axial section of the main safety-drive coupling.
Fig. 11 is a detail axial section on the line 11—11 of Fig. 3, showing the construction of the variable-speed driving mechanism for the shredding devices.
Figure 8:
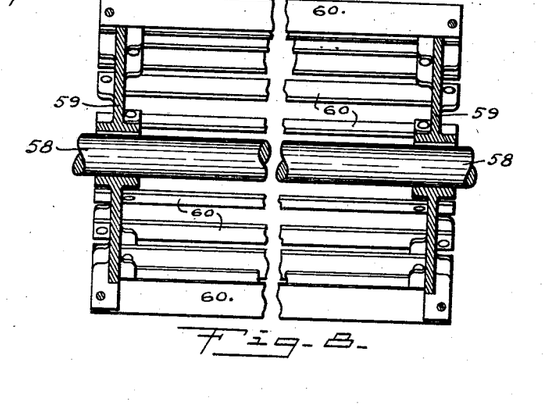
Fig. 8 is a longitudinal section of the grinding-cylinder or screen-beater.
Figure 10:
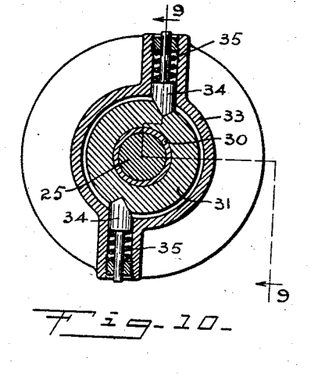
Fig. 10 is a transverse section of the same on the line 10—10 of Fig. 9.

The cutter-shaft 25 is arranged in longitudinal alinement with the main driving-shaft 15 and is connected therewith by means of the safety-coupling and alining devices shown in detail in Figs. 9 and 10. A coupling-disk 26 is secured on the end of the shaft 15, said disk having a pair of rollers 27 projecting from the face thereof and extending into radial diametrically opposite slots in the plate 28, which fits loosely about a collar 29 on the end of the shaft 25. On said shaft, adjoining said collar is a bearing-sleeve 30 on which is revolubly mounted the coupling-disk 31, the latter having at the face thereof a pair of rollers 32 which extend into radial slots in the plate 28 at positions intermediate the slots for the rollers 27. On the shaft 25, adjoining the inner end of the sleeve 30 and the hub of the disk 31, is secured the hub of the drum 33, which has an annular peripheral portion extending out over the hub of the disk 31, as shown. In said hub are formed angular notches adapted to receive the beveled inner end-portions of tangentially extending clutch-pins 34, which are disposed slidably in openings therefor in the drum 33, and are pressed yieldingly inward by springs 35, as shown in Fig. 10. The loose coupling, formed between the disks 26 and 31 by the plate 28 and the rollers 27 and 32, compensates for any slight mis-alinement of the shafts 15 and 25. The compression of the springs 35 is so adjusted that under normal loads the pins 34 will maintain a substantially fixed connection between the disk 31 and the shaft 25, while an excessive or abnormal load will cause the clutch-pins to be pushed outwardly against said springs sufficiently to permit the disk-hub to turn within the drum, the ends of the pins merely clicking into the notches at each revolution of the disk, and thus producing a warning signal to the machine attendant or operator.

Figure 5:
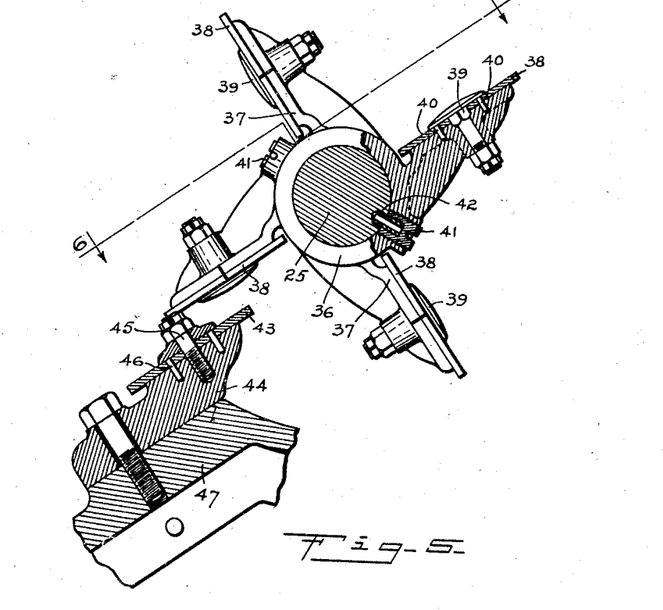
Fig. 5 is a detail vertical section through one of the cutting-cylinder and ledger-blade units.
Figure 6:
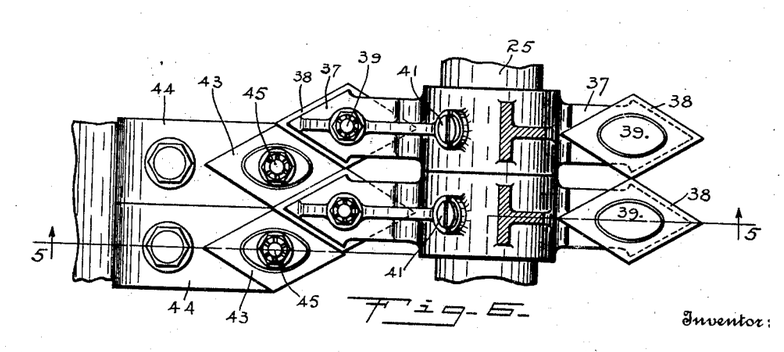
Fig. 6 is a detail section on the plane of the line 6—6 of Fig. 5.

The cutter-cylinder is carried upon the shaft 25 intermediate the end-frames 24, and comprises a series of independently mounted cutter-wheels, of which the detailed structure is best shown in Figs. 5 and 6. Each cutter-wheel comprises a hub 36 fitting about the shaft and having a plurality of flat radial arms 37 reinforced by ribs at the sides thereof which are rearward with respect to the direction of rotation. The ends of the arms are pointed and on the flat front faces thereof the rhombic knives or cutter-blades 38 are removably secured by means of the flat-headed bolts 39 and dowel-pins 40. The blades 38 are doubly reversible, that is to say, that by turning the plates over to change the sides which adjoin the arms 37, and also by reversing the plates to dispose the other ends outwardly, each of four V-shaped cutting edges may be presented in operative position for coaction with the ledger-blades. As the cutter-blades are backed and reinforced by the arms 37, the blades may be of relatively thin material, and may be formed by merely punching or shearing pieces of the required shape from sheet steel of suitable thickness, and after all of their cutting edges have become dulled, the plates may be economically replaced with new ones, in preference to sharpening the same to form fresh cutting edges. For connecting the cutter-wheels with the shaft, each of the hubs 36 is provided with one or more break-pins 42 which are preferably tubular in form and of relatively soft metal such as brass. Each of the pins 42 is carried at the inner end of a screw 41 which fits in a threaded hole in the hub, the pin extending into a radial hole in the shaft 25, as indicated in Fig. 5. An excessive load upon any cutter-wheel causes the shearing off of the pins 42 connecting the same with the shaft, and thus frees the wheel so that the shaft may turn without driving the same. Thus, minor obstructions, such as pieces of metal accidentally present in the forage material, if struck by one or more of the cutter-wheels, will merely cause the shearing of the break-pins of the particular wheels involved and will not disable the other wheels forming the cutter-cylinder. As each of the wheels is a relatively light unit, no one of the same will have sufficient momentum at any time to cause serious breakage by encountering an obstruction such as would cause the shearing of its break-pins. The removal and replacement of the broken or sheared break-pins is facilitated by the hollow or tubular form thereof, which permits the insertion therein of a suitable tool for withdrawing the pieces from the holes in which they are embedded. The several cutter-wheels are so arranged that the corners of the blades 38 on adjacent arms are substantially in contact with each other, as shown in Fig. 6, so that each series of said blades forms a substantially continuous serrated cutting edge. Ledger-blades 43 are provided of the same form as the blades 38, each of said blades 43 being secured to a holder-block 44 by a bolt 45 and dowel-pins 46, so that the blades may be reversed and inverted in the same way as said blades 38. The holder-blocks are removably secured to a longitudinal frame-member 47 which extends beneath the cutter-cylinder at the rearward side, and said holder-blocks are so positioned longitudinally of said frame-member that the ledger-blades are in alternating relation to the cutter-blades, or so that the pointed end of each enters the V-shaped space between a pair of the others, the working edges being in substantially shearing relation to each other.

Figure 4:
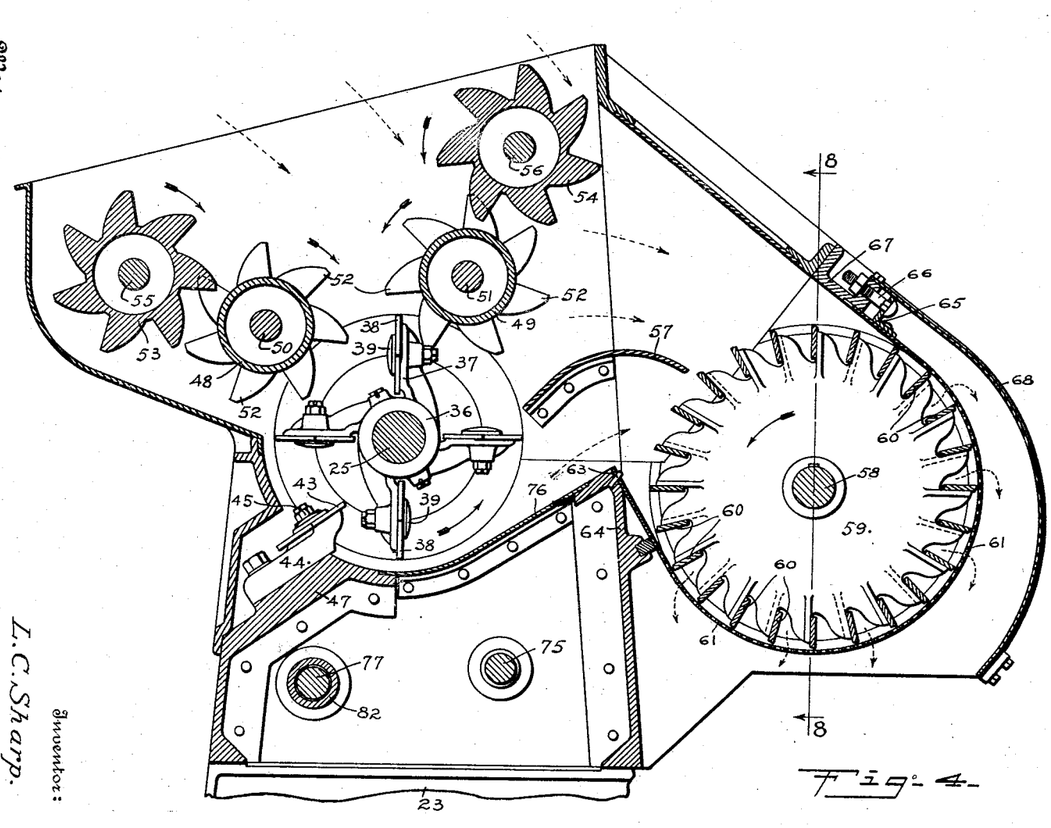
Fig. 4 is a detail transverse vertical section through the shredding, cutting and grinding devices.

The lower pair of feeding and shredding rollers 48 and 49 are arranged above the cutter-cylinder as best shown in Fig. 4, said rollers being mounted respectively upon the shafts 50 and 51, and having pointed teeth which are spaced longitudinally similarly to the ledger-blades, or so that said teeth and the points of the cutter-blades may intermesh longitudinally without interference with each other. The upper feeding and shredding rollers 53 and 54 are mounted respectively upon shafts 55 and 56, and said upper rollers are of substantially the same form as the lower rollers, except that the longitudinal spacing of the teeth is similar to that of the cutter-blades 38, whereby the teeth of said upper rollers may pass between the teeth of the lower rollers. The axes of the shafts 25, 51 and 56 lie in substantially a common plane which is slightly inclined forwardly from the vertical, while the axes of the shafts 50 and 55 lie in a plane which is inclined upwardly and rearwardly from the cutter-cylinder, so that between the shredding rollers there is a downwardly converging throat or space into which the forage material is fed through the open upper portion of the housing. The driving devices for the shredding rollers are so arranged that all of said rollers move downwardly at the sides thereof adjoining said throat or feed-space, and so that the upper rollers 53 and 54 are revolved less rapidly than the lower rollers 48 and 49, the latter in turn being driven at a rate considerably less than that of the cutter-cylinder. By reason of said directions of rotation, the intermeshing portions of the rear rollers 48 and 53, and also said portions of the front rollers 49 and 54, move in opposite directions, so that the teeth of each tends to clear material caught by the teeth of the other, and also tends to break and tear apart the longer straws or stems which may fall between the teeth. It will be noted also that the intermeshing portions of the roller 49 and the cutter-cylinder move in opposite directions, while the intermeshing portions of the roller 48 and the cutter-cylinder move in the same direction, so that materials caught between the cylinder and said roller 48 tend to be carried through and thrown down toward the ledger-blades. The teeth of the shredding rollers are all so proportioned that they will not be in cutting or shearing relation to each other while passing through the zones of intersection.

The material cut and carried through the ledger-blades by the cutter-cylinder tends to be thrown forwardly and upwardly from the lower portion of said cylinder, and a curved deflector-plate or baffle 57 is provided for directing said material downwardly and forwardly into the grinding or screen-beating cylinder. The latter is mounted on a shaft 58, and comprises a pair of peripherally recessed and flanged end-plates 59 which are secured to said shaft adjoining the end-frames 24, and which are connected to each other by a plurality of flat bars 60, the latter being disposed edgewise radially of the cylinder, and their ends secured to the flanges of the end-plates, as shown. The grinding cylinder thus resembles an open paddle-wheel, and is preferably of a diameter greater than that of the cutter-cylinder, and driven at a rate such that its peripheral velocity is equal to or greater than that of the cutter-cylinder. The screen 61 is disposed about the lower and front sides of the cylinder, the end portions of the screen resting upon annular flanges 62 which extend inwardly from the end-frames 24. The rear edge of the screen is attached to pins 63 on the frame or housing-member 64 near the rear side of the cylinder. Adjacent to the upper or front edge of the screen an angle-bar 65 is secured thereto, said angle-bar being connected by bolts 66 with the frame-member 67. By means of said bolts the screen may be placed under tension and drawn snugly about the annular flanges 62, so as to be maintained in a uniform cylindrical shape, with its inner surface close to the outer edges of the cylinder-bars 60 around slightly more than half the periphery of the cylinder. The screen is preferably formed by a perforate metal plate of considerable thickness, or so that the thickness of the plate is approximately equal to the diameter of the openings therein, as shown in Fig. 7. The use of the thick screen-plate enables the final milling of the material to be effected by the coaction therewith of the cylinder-bars 60. Said bars sweep across the inner surface of the screen at a high speed, with their edges very close to the screen surface, or with said edges substantially in a shearing relation to the edges of the openings through the screen. In practice, because of the previous disintegration of the forage material by the shredding rollers and cutter-cylinder, a large proportion of the material reaching the screen is already reduced to particles small enough for the finishing product, or of a size such as to easily pass through the screen-openings. The cut and shredded material will usually contain, however, a certain amount of elongated pieces, such as straws or pieces of the plant-stems, of a size which it is undesirable to incorporate in the finished product. Such straws or stem-portions are usually of smaller diameter than the screen-openings and might pass through the screen endwise if directed substantially perpendicular to the screen-surface, but owing to the rapidity with which the surface is swept by the cylinder-bars 60 there is no opportunity afforded for the elongated pieces to pass through the screen. Thus a stem or straw A starting through the screen-opening, as indicated in Fig. 7, is immediately caught by one of the bars 60 and is cut or broken off at the screen surface. If a thin screen were employed it would be possible for the elongated particles to pass through the openings without assuming an upright or nearly perpendicular relation to the screen-surface, and some of said particles might be pushed through the openings by the bars 60 striking the ends thereof when the same were in an inclined position such as that of the stem B in Fig. 7, or at a position more nearly parallel with the screen-surface. With the thick screen, however, it will be seen that the ends of the stems will strike the sides of the openings and will thus be prevented from being pushed through the same when struck by the bars 60. The space outside the screen communicates with the hopper 19 and thence with the conduit 18 leading to the exhaust-blower, the opening to said hopper being directly beneath the screen, and the screen being inclosed or housed by the frame-sides 24, the member 64, and a front housing-plate 68, so that all the air drawn through the hopper and conduit to the blower must first pass through the screen.

Figure 1:
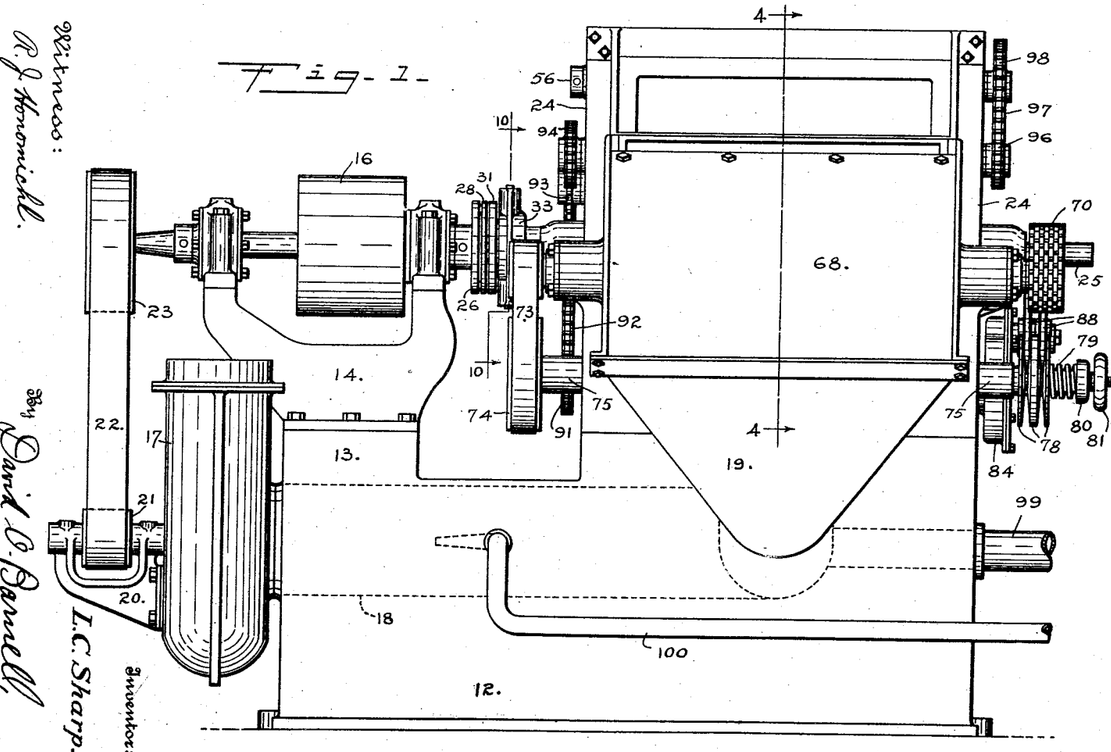
Fig. 1 is a front view of a machine embodying my invention.
Figure 2:
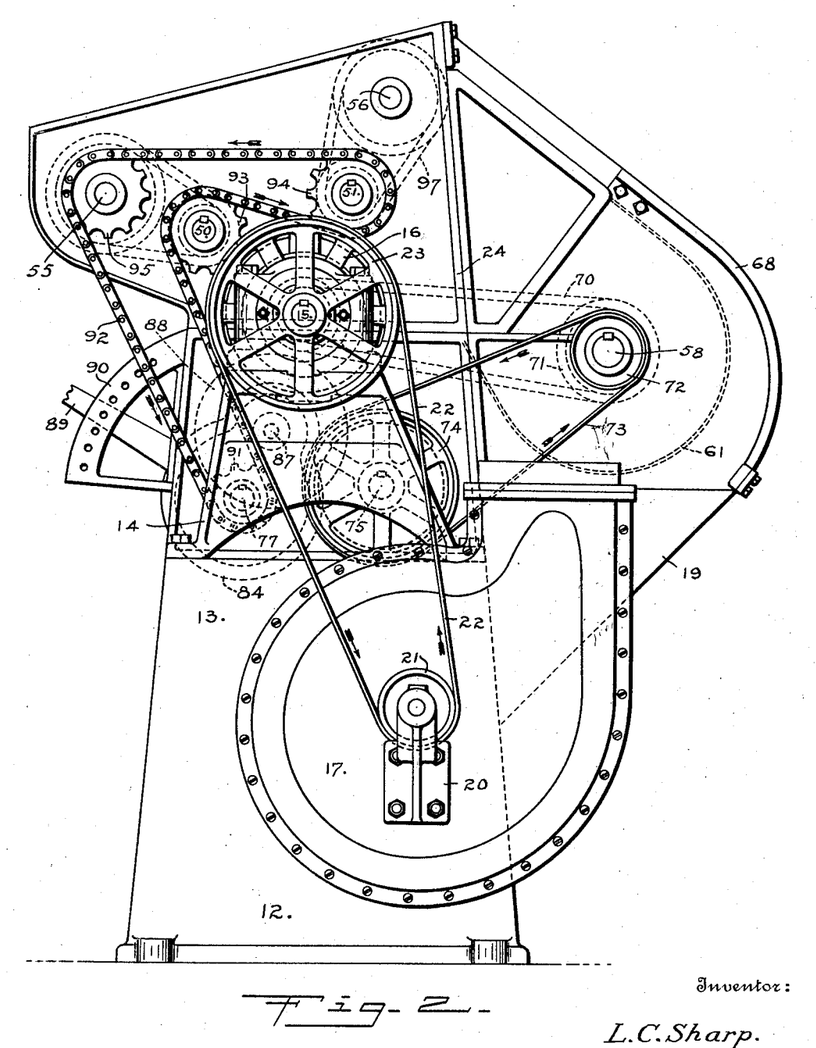
Fig. 2 is an end view of the same.
Figure 3:
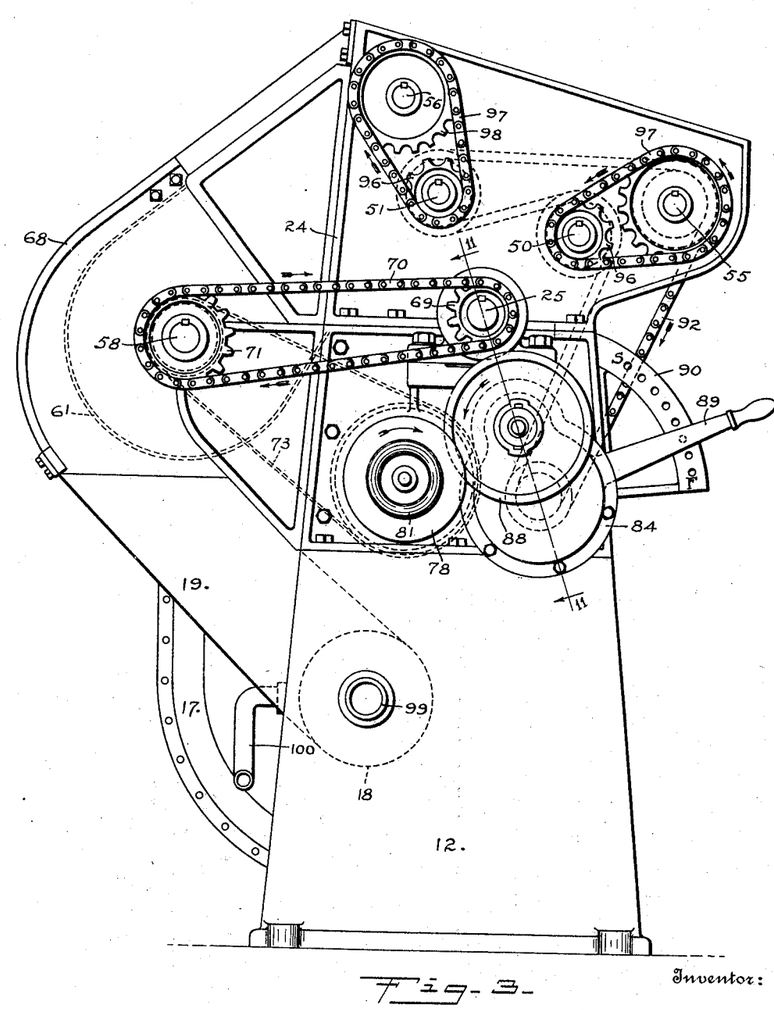
Fig. 3 is a view of the end opposite that shown in Fig. 2.

For driving the screen-beater or grinding-cylinder, there is provided on the cutter-shaft 25, at the end thereof opposite that connected with the main drive-shaft 15, a sprocket-wheel 69 from which the chain 70 extends to a sprocket-wheel 71 secured on the end of the screen-beater shaft 58, as shown in Fig. 3. At the other end of said shaft 58 there is secured a pulley 72, from which a belt 73 is extended to a pulley 74 secured on the end of a shaft 75, the latter extending longitudinally through the frame beneath the cutter-housing plate 76. A second shaft 77 is extended through the frame parallel with said shaft 75 beneath the frame-member 47. At the end opposite the pulley 74 said shafts 75 and 77 are operatively connected by a variable-speed driving device of which the structure may be understood by reference to Figs. 1, 3 and 11. Near said end of the shaft 75 there are mounted the plates 78 which are splined to the shaft so as to be slidable but non-rotatable relative thereto. The adjacent sides of said plates are conically beveled to provide between them narrow wedge-shaped annular spaces, and the plates are pressed toward each other axially of the shaft by means of a coil spring 79 disposed around the shaft adjoining the outer plate, the outer end of said spring resting against a collar 80 which may be moved longitudinally, by means of the wheel-nut 81 screwed on the threaded end of the shaft, to vary the compression of the spring. A tubular sleeve 82 is revolubly mounted in the frame coaxially with the shaft 77, said shaft being revolubly mounted in bearings 83 disposed within the sleeve at the ends thereof, as shown in Fig. 11. On the protruding end of said sleeve 82 there is secured a gear-housing 84, and within said housing, secured upon the end of the shaft 77, there is a gear 85. Said gear meshes with a pinion 86 which is mounted revolubly upon a stud 87 carried by the housing 84. The hub-portion of said pinion extends through an opening in the side of the housing, and upon said extended hub-portion there are secured the friction-plates 88. The edges of said plates 88 are conically beveled, at the same angle as the beveled sides of the plates 78, whereby the former are adapted to extend between the latter, as best shown in Fig. 1, forming a frictional driving connection therewith by reason of the pressure between the contacting faces, caused by the spring 79. An adjusting-lever 89 connected with the housing 84 and extending alongside a quadrant 90, enables said housing to be swung about the axis of the shaft 77, to thereby vary the distance between the axes of the plates 78 and 88 and the effective radius of the frictionally contacting conical driving surfaces. Referring to Fig. 3, it will be seen that by raising the adjusting-lever 89 to move the friction-plates 88 toward the driving plates 78, the effective radius of the latter will be reduced, with a corresponding reduction in the speed at which the plates 88 and pinion 86 will be driven, while movement of the lever downwardly will increase the driving radius and thus increase the speed of the driven shaft 77 relative to that of the driving counter-shaft 75. At that end of the machine shown in Fig. 2, there is secured on the shaft 77 a sprocket-wheel 91, from which a chain 92 extends around sprocket-wheels 93 and 94, secured respectively on the shredding-roller shafts 50 and 51, to drive said shafts and rollers. An idler-sprocket 95 is mounted revolubly on the protruding end of the shaft 55, the chain 92 being returned over said idler to the driving sprocket 91. On the shafts 50 and 51, at the ends shown in Fig. 3, there are secured small sprocket-wheels 96, from which the chains 97 extend around and drive the larger sprocket-wheels 98 secured on the ends of the shafts 55 and 56, whereby to drive the upper shredding-rollers at a speed less than that of the lower shredding-rollers.

In connection with the conduit 18 which extends from the hopper 19 to the exhaust-blower, there is preferably provided an inlet pipe 99 which may be connected with a source of heated air, which may be supplied when desired to effect a drying of the milled product during its passage through the blower and the discharge-conduit and collector therewith connected. There is also provided in connection with said conduit 18 a water-pipe 100, through which moisture may be supplied to and mixed with the milled material when the same is dryer than is desirable.

In the operation of the machine, the forage material is fed into the throat or convergent space between the shredding-rollers, where the larger masses of the material are broken up by the combing and breaking action thereon of the teeth of said rollers. At this stage of the operation, when milling cured forage especially, certain fragile portions of the material, such as the leaves and smaller stems, become detached from the mass and are carried through the front rollers 49 and 54 to the screen-beater, passing thereto above the baffle 57, and being directed by the air-currents which are drawn through the housing by the exhaust-blower, the general direction of said currents being as indicated by the dotted arrows in Fig. 4. The fragile and brittle portions of the material, which pass directly to the screen from the shredding-rollers, are quickly carried through the screen by the air-suction, and are thus delievered to the finished product with a minimum production of fine dust-like particles. The coarser portions of the material, long straws, stems and the like, are carried downward between the shredding-rollers, and thereby thrown into the cutter-cylinder. By reason of the relatively low speed of the upper pair of shredding-rollers, the slightly greater speed of the lower pair of shredding-rollers, and the relatively high speed at which the cutter-cylinder is driven, the descent of the material through the feed-throat is so regulated as to prevent overloading or clogging of the cutter-cylinder. The rate at which the material is delivered to the cutter-cylinder may be changed at any time during the operation by suitable adjustment of the lever 89 which controls the frictional variable-speed drive mechanism between the shafts 75 and 77, and thereby varying the rate at which the shredding-rollers are driven relatively to the speed of the cutter-cylinder. By the action of the cutter-cylinder thereon, a large proportion of the material passing through the same is reduced to finished sizes suitable to pass immediately through the screen and into the finished product; but such portions of the material as may reach the screen-cylinder without being sufficiently reduced are further milled or ground at the inner surface of the screen by the coaction of the rapidly moving bars 60 and the screen itself, as before described. In the design of the machine it is important that the screen-area be amply large to accommodate the output from the shredding and cutting mechanism, as, obviously, an under-capacity of the screen will limit the total output of the machine. The open construction of the screen-beating cylinder provides a large space within the cylindrical cage formed by the bars 60, in which an excess volume of the cut material may accumulate temporarily if for any reason the rate of delivery of the material to said cylinder should exceed the rate at which it will pass the screen. Unless an excessive rate of delivery of cut material to the beater-cylinder be continued for a considerable time, the temporary excess stored within the cylinder-space will be rapidly thrown outward and worked through the screen, so that normal operation will be resumed.

Now, having described my invention, what I claim and desire to secure by Letters Patent is:

1. In a machine of the class described, a double series of toothed shredding-rollers mounted to rotate on axes lying in convergent planes, a cutter-cylinder having longitudinally serrated cutting edges and disposed in the intersection of said convergent planes, stationary ledger-blades having cutting edges arranged for coaction with the cutting edges of said cylinder, the teeth of said cylinder and of each series of the shredding-rollers being interspaced longitudinally and successively intermeshing at the adjacent sides thereof, and means for actuating said rollers and cylinder whereby the latter is revolved at high speed and the rollers at lower speeds but at rates increasing progressively according to the proximity of the rollers to the cylinder.

2. In a machine of the class described, two series of toothed shredding-rollers disposed at opposite sides of a downwardly converging feed-throat, a cutter-cylinder disposed at the bottom of said feed-throat and having longitudinally serrated cutting edges, ledger-blades having cutting edges arranged for coaction with the cutting edges of said cylinder, the teeth formed by said serrated cutting edges of the cylinder being intermeshed longitudinally with the teeth of the adjacent shredding-rollers, and the latter similarly intermeshing with the teeth of the other shredding-rollers, and driving means for revolving said shredding-rollers at rates less than that of the cutter-cylinder and in directions tending to move material in the feed-throat toward said cylinder.

3. In a machine of the class described, the combination with a housing, and an exhaust-blower arranged to withdraw air therefrom of a screen intercepting the passage to said exhaust-blower, means movable rapidly across the surface of said screen in substantially shearing relation therewith to comminute materials at said surface, shredding-rollers arranged to receive forage materials between them and to deliver portions of said material to the screen, and cutting devices to which are delivered portions of the material from the shredding-rollers and from which the cut material is delivered to the screen.

4. In a machine of the class described, a cutter-cylinder having series of radial arms pointed at the ends thereof and having flat forward faces extending radially and longitudinally of the cylinder-axis, rhombic cutter-blades disposed on said flat faces of the arms, and means for removably securing said blades thereon, the blades being invertible and reversible to present each of their V-shaped edges outwardly and forwardly, as described.

5. In a machine of the class described, a cutter-cylinder comprising a shaft, a series of wheels mounted independently upon said shaft, a series of rhombic cutter-blades removably secured to said wheels and arranged to form continuous longitudinally serrated cutting edges, rhombic ledger-blades arranged in shearing relation to said cutter-blades, a support for said ledger-blades, and means for removably and independently securing the ledger-blades to said support.

6. In a machine of the class described, the combination with a cutter-cylinder, of a series of toothed shredding-rollers arranged in convergent planes to inclose between them a convergent feed-space extending to said cylinder, means for driving said cutter-cylinder, and continuously variable-speed driving means connecting said cylinder and rollers for actuating said shredding-rollers to carry material in the feed-space toward the cutter-cylinder.

LEE C. SHARP.